United States Patent
Razdan et al.

(10) Patent No.: US 7,729,541 B2
(45) Date of Patent: Jun. 1, 2010

(54) COMPARATIVE AND ANALYTIC APPARATUS METHOD FOR CONVERTING TWO-DIMENSIONAL BIT MAP DATA INTO THREE-DIMENSIONAL DATA

(75) Inventors: Anshuman Razdan, Phoenix, AZ (US); John Femiani, Mesa, AZ (US)

(73) Assignee: Arizona Board of Regents, A Body Corporate, Acting for and on Behalf of Arizona State University, Tempe, AZ (US)

( * ) Notice: Subject to any disclaimer, the term of this patent is extended or adjusted under 35 U.S.C. 154(b) by 607 days.

(21) Appl. No.: 10/547,274

(22) PCT Filed: Mar. 16, 2005

(86) PCT No.: PCT/EP2005/051219

§ 371 (c)(1),
(2), (4) Date: Oct. 4, 2006

(87) PCT Pub. No.: WO2004/077349

PCT Pub. Date: Sep. 10, 2004

(65) Prior Publication Data

US 2007/0036437 A1 Feb. 15, 2007

Related U.S. Application Data

(60) Provisional application No. 60/451,123, filed on Feb. 27, 2003.

(51) Int. Cl.
*G06K 9/00* (2006.01)
*G06K 9/03* (2006.01)

(52) U.S. Cl. .................. 382/186; 382/187; 382/310
(58) Field of Classification Search ............ 382/186, 382/187, 310, 177, 174, 229, 203, 289, 185, 382/215, 120, 224, 189, 198, 190, 197; 345/179; 708/109; 704/256.1, 256, 251; 341/22; 706/20, 706/25

See application file for complete search history.

(56) References Cited

U.S. PATENT DOCUMENTS

| | | | | |
|---|---|---|---|---|
| 5,428,717 | A * | 6/1995 | Glassner | 345/423 |
| 6,100,893 | A * | 8/2000 | Ensz et al. | 345/420 |
| 6,445,820 | B1 * | 9/2002 | Love | 382/187 |
| 6,556,696 | B1 * | 4/2003 | Summers et al. | 382/128 |
| 2002/0114508 | A1 * | 8/2002 | Love | 382/154 |

* cited by examiner

*Primary Examiner*—Sheela C Chawan
(74) *Attorney, Agent, or Firm*—Richard E. Oney; Tiffany & Bosco, P.A.

(57) ABSTRACT

A method is provided for converting a two-dimensional image or bitmap of a handwritten manuscript into three-dimensional data The three-dimensional data can be used to automatically recognize features of the manuscript, such as characters or words. The method includes the steps of: converting the two-dimensional image into three-dimensional volumetric data; filtering the three-dimensional volumetric data; and processing the filtered three-dimensional volumetric data to resolve features of the two-dimensional image. The method can be used, for example, to differentiate between ascenders, descenders, loops, curls, and endpoints that define the overall letter forms in handwritten text, manuscripts or signatures.

20 Claims, 6 Drawing Sheets

COMPARATIVE AND ANALYTIC APPARATUS METHOD FOR CONVERTING TWO-DIMENSIONAL BIT MAP DATA INTO THREE-DIMENSIONAL DATA

RELATED APPLICATION DATA

This application is based on and claims the benefit of U.S. Provisional Patent Application No. 60/451,123 filed on Feb. 27, 2003, the disclosure of which is incorporated herein by this reference.

BACKGROUND

This invention relates generally to automatic optical recognition of two-dimensional image data. More specifically, it relates to an apparatus and method for recognizing and analyzing two-dimensional image data, such as typewritten or printed text, by converting the two-dimensional data into three-dimensional data.

The problem of recognizing written characters by machine has been investigated in great detail. Many digital library projects have focused on application of automating character recognition to create computer accessible collections of historic and cultural materials to support scholarship in the humanities. Once in digital form, the ability to store, enhance, search and interact with the content permits powerful analysis and comparison. The original written resources involved in these projects range from typewritten or printed text, to handwritten manuscripts that can vary dramatically in the form and structure of the written characters.

Most digital library projects involving handwritten manuscripts work with images and human translations of handwritten materials. Some previous projects, however, have attempted to digitize and automatically translate handwritten manuscript materials using optical character recognition (OCR) techniques to convert the materials to machine-readable form. These projects include those described by Rath, T. and Manmatha, R., "Features for Word Spotting in Historical Manuscripts," Proceedings of ICDAR 2003 Conference, Vol. 1, 218-22 (2002); T. Theeramunkong, C. Wongtapan, S. Sinthupinyo, "Offline Isolated Handwritten Thai OCR Using Island Based Projection with N-Gram Models and Hidden Markov Models," Proceedings of ICADL 2002, Vol. 2555, 340-51 (2002); and T. Theeramunkong, V. Sornlertlamvanich, T. Tanhermhong, W. Chinnan, "Character Cluster Based Thai Information Retrieval," Proceedings of the Fifth International Workshop on Information Retrieval with Asian languages, Hong Kong, China, 75-80 (2000); as well as the Shuhai Wenyuan Classical Chinese Digital Database and Interactive Internet Worktable project at the University of Hawaii at Manoa.

Automated recognition to provide access to printed textual materials involves scanning and computer assisted character recognition, typically using an OCR program to identify the letter forms to "translate" from the graphic image output of the scanner. The general process of character recognition of handwritten manuscripts is based on two-dimensional image recognition or stochastic methods applied to the two dimensional image. These include, for example, neural networking and HMM (Hidden Markov Models). In all cases, the script (page, letters, words etc.) is represented as two-dimensional bitmaps. Various methods then try to infer the letter from this two-dimensional image.

The key to machine recognition of handwritten materials is the ability to differentiate between the ascenders, descenders, loops, curls, and endpoints that define the overall letter forms. Identification of contractions, abbreviations, and punctuation creates similar challenges. Development of the techniques to extract the features from a handwritten line of characters is a significant challenge for computer scientists and has resulted in techniques to extract, sequence, cluster, categorize, and compare features to attempt to recognize and assign meaning to a given character.

The accuracy of the OCR process is directly proportional to the quality, regularity and resolution of the letter forms. For mechanically replicated letter forms, such as typed or typeset materials, this process is relatively straightforward. For handwritten materials with variation in letterform, however, the problem of recognition is extremely complex because the letter forms can vary significantly throughout a document. Human intervention can be used to identify and prompt problem letter forms and assist in "training" the OCR programs, which can significantly improve accuracy as similar documents are scanned.

Even with human intervention, however, complete recognition is complicated dramatically for handwritten materials, such as manuscripts or musical scores, due to variables in the content. One of the variables in handwritten content is the letter forms that vary significantly throughout the document. This problem is compounded when the letter forms overlap or merge with adjacent characters. Consequently the accuracy rates for OCR plunge dramatically even with human intervention to correct and train the recognition software, and accuracy rates fall below perfect recognition. For handwritten materials the accuracy rate reaches 85-90% for closed tests, but open tests where "trained" OCR programs are used to recognize new text similar to the proposed project, current accuracy rates range from 60-75%.

FIGS. 1 and 2 show two examples of the type of complex handwritten materials that illustrate some of the complexities that present problems in the automatic recognition of such text. FIG. 1 shows an example of handwritten text, and FIG. 2 shows an example of a rubric from Spanish archives from the $17^{th}$ century. These examples have been provided through the courtesy of the Hispanic Research Center at Arizona State University in Tempe, Ariz. The example of FIG. 1 shows the cursive writing with varying letter forms and overlapping characters that must be recognized automatically. In addition, these manuscripts include abbreviations, rubrics, and signatures that must be interpreted, such as the rubric shown in FIG. 2. These examples demonstrate some of the problems presented in attempting to automatically recognize handwritten text. For instance, the cursive writing style of the examples results in a lack of separation between characters, which makes automatic recognition more difficult. They also demonstrate variation of letter forms. Unlike type written or printed text, each character varies slightly in shape and size from identical characters elsewhere in the document even when created by the same individual. For example, the bottom loop of the letter "y" in FIG. 1 runs into the line below it. In addition, the examples show different writing styles. They are written by different people and include different styles of cursive writing. The examples also show rubrics and abbreviations, i.e., sprinkled throughout the manuscripts are graphic images that convey meaning and must be recognized and associated with meaning more complex than a single letterform. They also illustrate accents and omitted characters. Accents, notations and sometimes missing characters are inserted between the rows of characters. These features of handwritten manuscripts greatly increase the complexity of the problem of automatic recognition of such manuscripts.

It is an object of the present invention to provide an apparatus and method for addressing the problems presented in attempting to automatically identify complex two-dimensional image data, such as handwritten text, manuscripts, signatures and the like.

Additional objects and advantages of the invention will be set forth in the description that follows, and in part will be apparent from the description, or may be learned by practice of the invention. The objects and advantages of the invention may be realized and obtained by means of the methods and apparatus pointed out in the appended claims.

SUMMARY

To achieve the foregoing objects, and in accordance with the purposes of the invention as embodied and broadly described in this document, there is provided a method for converting a two-dimensional image or bitmap into three dimensional data. The two-dimensional image can represent a handwritten manuscript. A presently preferred method of the invention includes the steps of: converting the two-dimensional image into three-dimensional volumetric data; filtering the three-dimensional volumetric data; and processing the filtered three-dimensional (3D) volumetric data to resolve features of the two-dimensional image. The processing of the volumetric data can include using an isosurface extraction to extract a 3D surface mesh representing the image. The extracted surface mesh representation can then be used to resolve features of the two-dimensional image, such as separating overlapping lines in the manuscript. The processing of the volumetric data can include determining an axis or curve representing the median of a tubular portion of a surface mesh representation of the filtered three-dimensional volumetric data. The method can be used, for example, to differentiate between the ascenders, descenders, loops, curls, and endpoints that define the overall letter forms in a handwritten manuscript.

BRIEF DESCRIPTION OF THE DRAWINGS

The accompanying drawings, which are incorporated in and constitute a part of the specification, illustrate the presently preferred embodiments and methods of the invention. Together with the general description given above and the detailed description of the preferred embodiments and methods given below, they serve to explain the principles of the invention.

DESCRIPTION

Reference will now be made in more detail to the presently preferred embodiments and methods of the invention as illustrated in the accompanying drawings. While the present invention will be described more fully hereinafter with reference to these examples and accompanying drawings, in which aspects of the preferred manner of practicing the present invention are shown, the description which follows is to be understood as being a broad, teaching disclosure directed to persons of skill in the appropriate arts, and not as limiting upon the present invention.

The present invention focuses on enhancing the capacity to automatically recognize complex two-dimensional information, such as handwritten manuscripts. The process of automatic recognizing handwritten manuscripts having the complexities discussed above can be broken down into the following major steps: (1) separating the rows of characters; (2) breaking down each word and then each character into an individual unit; (3) attaching meaning to characters, rubrics, and abbreviations; (4) proofing and correcting, initially to train the optical character recognition (OCR) program, then also to correct errors and add information not identified by the process; and (5) translating to other dialects and languages. The present invention can be used to address each of these steps.

Figure 4:
FIG. 4 shows the letter "l" appearing in the handwritten text of FIG. 3 and isolated from that text.
Figure 5:
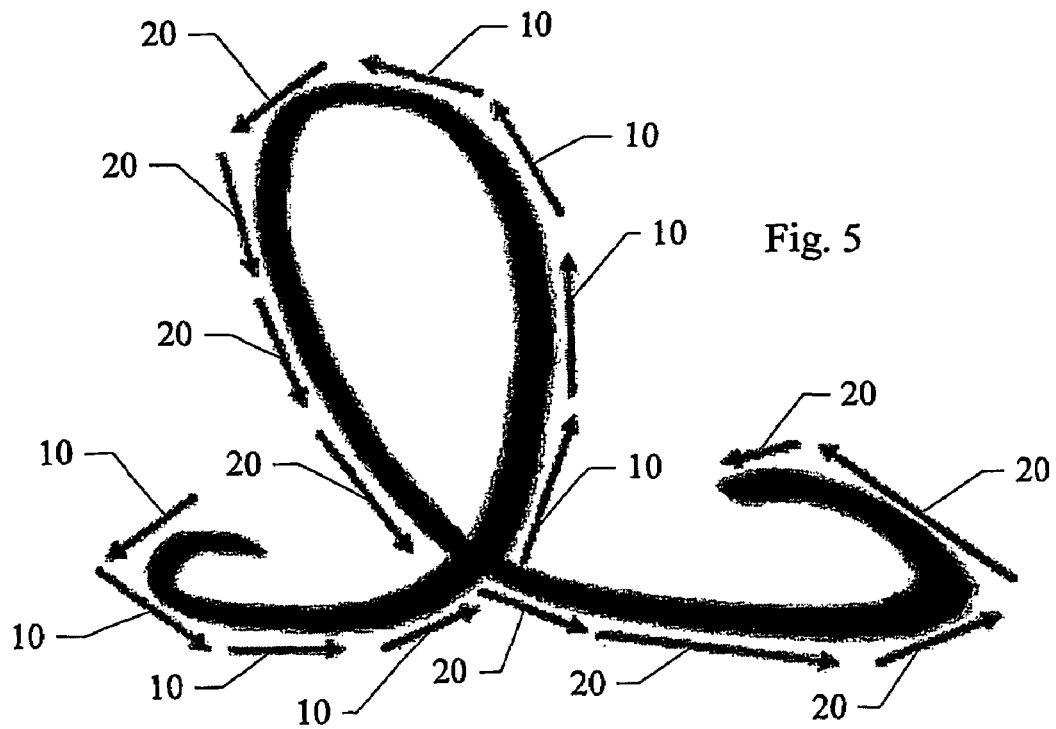
FIG. 5 shows chain code for the letter "l" of FIG. 4.

Let us for the moment focus on individual characters. Chain codes can be used to approximate individual characters by straight-line segments. The use of chain codes is a well-known method for contour coding. Consider the example shown in FIGS. 4-5 and focus on the letter "l". A chain code can be considered as a piecewise linear approximation parameterized according to the movement of the pen. This means that the letter "l" must be approximated by straight-line segments, i.e. broken down into simple subunits. However the segments must be connected sequentially in the same manner as when the person wrote the letter. In case of this example, however, there is a loop in the letter "l". Starting from left (assuming the writer wrote left to write) the pen moves right and up and then comes down goes over the previous mark and ends on the right. The resulting chain code is shown in FIG. 5.

The arrows 10 show the first half and the arrows 20 show the latter half in writing the letter "l". By using the method of the invention, loops of a character, such as the loop of the "l" in FIGS. 4 and 5, can be separated and converted into chain codes, as described below more fully. The invention can thus greatly simplify the task of separating characters (overlaps) and identifying the chain codes correctly within a single unit or character.

When a person writes with a pen on paper, the pen usually does not result in a stroke of opaque color on the paper. Rather, the color of the ink in the pen will combine with the color of the paper on which the ink is deposited. Thus, if a person writes a line that crosses another line, the effect is that the point where the two lines cross will appear darker than either line itself appears. Additionally, fluctuations in the pressure applied to the pen will affect the amount of ink dispensed as an individual writes. This results in changes in the amount of ink on the document, and affects the opacity and darkness of the line being drawn.

Where two lines cross on a piece of paper, a person can often intuitively sense which line passes above the other. Beginning artists are encouraged to explore this effect of how lines are perceived by doing line and contour drawings. Subtle variations in the intensity of the line give a viewer a sense of dimension that assists in recognizing written text. Some lines appear to come forward while others appear to sink backward, so even without chiaroscuro-shading or perspective, a clear impression of depth can be conveyed on an approximately two-dimensional piece of paper.

Given a sample of handwriting as a two-dimensional bitmap array of scalar intensity values, the present invention can be used to find a three-dimensional volume that will highlight the effects of the changes in opacity of the pen stroke. Successful application of this approach is based on several assumptions: (i) that the 3D volume data reflects the impression of depth and thickness of the line; (ii) that sufficient differences exist to mark relative depths where two lines cross; and (iii) that the volume data can consistently indicate which lines connect, and which lines pass in front of the others.

According to, the present invention, a two-dimensional script, image or bitmap is converted into three-dimensional data using a novel process. This three-dimensional data can be used to assist with the automatic recognition of the two-dimensional information. This technique provides a unique approach to character recognition not used by previous methods.

Figure 6:
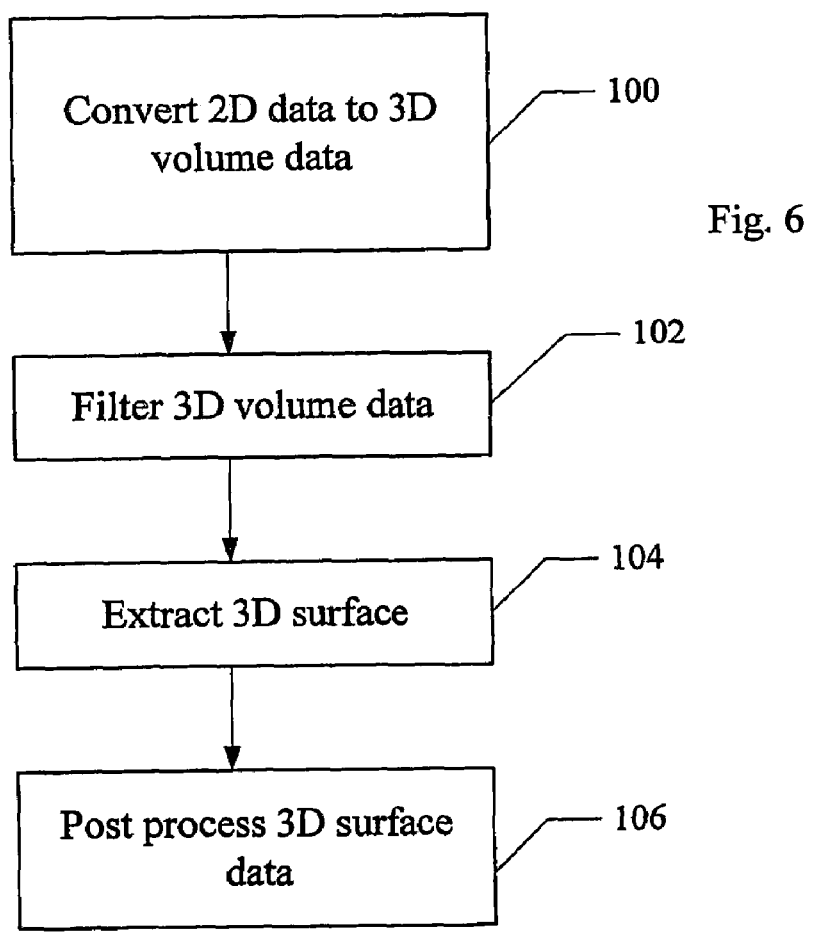
FIG. 6 is a block flow diagram of the process for converting a two-dimensional bitmap into three-dimensional data according to the invention.

Referring to FIG. 6, a presently preferred method of the invention includes the steps of: converting a two-dimensional image into three-dimensional volumetric data (step 100) i.e. voxelizing the data; applying filtering to smooth the voxel (volumetric) data (step 102); extracting from the voxel data a three-dimensional surface mesh (step 104) representing the character, which mesh includes one or more tubular structures; and post-processing the three-dimensional surface mesh (step 106) to find the medial axis or curves representing the median of the tubular structures of the surface mesh.

Converting 2D Bitmap Data to 3D Volume Data

According to a presently preferred method, the two-dimensional bitmap data is converted to three-dimensional volume data (step 100) as follows. First, the pixel at position (x, y) of the 2D bitmap is elevated to a voxel based on the value at pixel[x,y] so that the higher the intensity of the pixel, the higher the z-component of the voxel. Starting with a volume of all 0 voxels, those voxels near (x, y, pixel(x, y)) are given an intensity related to the intensity of the original pixel. Just using the original intensity works well. It will be understood, however, that other functions of the original intensity also can be used such as, for example, an exponential function.

After the voxels have been set, a number of scattered, unconnected points appear in the volume. Attempting to view the volume at this point would reveal mostly noise. To address this issue, the volume data can be filtered (step 102).

Filtering

Filtering to smooth the voxel data (step 102) can fill in all of the gaps and can be achieved by applying a blurring filter to the volume data. This filtering allows connections to form between voxels that are near each other to begin to form patterns. Multiple iterations of blurring can be performed until the points have melted into a field that has the highest intensity roughly along the path that a person would imagine a line follows on a piece of paper.

In a presently preferred method, the first filter used is a simple moving average filter. Each voxel is set to the value of the voxel+½ of the mean of all of the 26 neighbors of the voxel. The resulting averages are then allowed to feed into each other—computing a new value for voxel(x, y, z), and then using that newly computed value to find the new value for voxel(x+1, y, z). This type of filter is commonly used in 2D image editing tools to blur images. It will be understood by those of skill in the art, however, that other types of standard filters can also be applied to filter the volume data. One such filter, for example, is the Gaussian filter.

Exemplary pseudocode for implementing the conversion of two-dimensional data to three-dimensional volume data and for filtering the volume data is set forth below. By implementing this pseudocode on a computer readable medium a computer can be programmed for converting two-dimensional data to three-dimensional volume data according to the invention.

| 3D Surface Extraction |
| --- |
| 1   //Generate the volume (width by height by 15) |
| 2   For z = 0 . . . 15−1 |
| 3       For x = 0 . . . width−1 |
| 4           For y = 0 . . . height−1 |
| 5               If pixel[x,y] in z*16−30 . . . z*16+30 |
| 6                   Voxel[x,y,z] = pixel[x,y] |
| 7               Else |
| 8                   Voxel[x,y,z] = 0 |
| 9 |
| 10 |
| 11  //Apply the filter K times |
| 12  For i = 0 . . . K−1 |
| 13      For z = 0 . . . 15−1' |
| 14          For x = 0 . . . width−1 |
| 15              For y = 0 . . . height−1 |
| 16                  Voxel[x,y,z] = (26*voxel[x,y,z] + voxel[x−1,y,z] +. . . + voxel[x−1,y−1,z−1])/(2*26) |

Once the scanned two-dimensional data is converted into three-dimensional data (step 100) and appropriate filtering is used (step 102), an isosurface extraction algorithm can be applied to the three-dimensional data (step 104) to render an isosurface in the volumetric data.

One suitable isosurface extraction algorithm is a Marching Cubes algorithm, which is an algorithm for creating a polygonal surface representation of an isosurface through a 3D scalar field. Using a Marching Cubes program, one can define a voxel (or cube) by the pixel values at the eight corners of the cube. If one or more pixels of a cube have values less than the user-specified isovalue, and one or more have values greater than this value, then the voxel must contribute some component of the isosurface. By determining which edges of the cube are intersected by the isosurface, one can create triangular patches that divide the cube between regions within the isosurface and regions outside. By connecting the patches from all cubes on the isosurface boundary, one can generate a surface representation. The Marching Cubes algorithm is well known in the art and is described more fully in Lorensen, W. E. and H. E. Cline, "Marching Cubes: A High Resolution 3D Surface Construction Algorithm, Computer Graphics, vol. 21, no. 3, pp. 163-169 (July 1987) and in Watt, A., and Watt, M., Advanced Animation and Rendering Techniques (Addison-Wesley, 1992).

As will be apparent to those of ordinary skill in the art, there are many segmentation methods other than the Marching Cubes method that may be used for surface extraction from the 3D data. Segmentation of volume data is a process of voxel classification that extracts regions by assigning the individual voxels to classes in such a way that these segmented regions possess the following properties: (1) voxels within the same region are homogeneous with respect to some characteristic (e.g., gray value or texture); and (2) voxels of neighboring regions are significantly different with respect to the same characteristic. One example of such a segmentation method is described by A. Huang, G. Nielson, A. Razdan, G. Farin, D. Capco, and P. Baluch, "Line and Net Pattern Segmentation using Shape Modeling" IS&T/SPIE Conference, Visualization and Data Analysis 2003. Another example is described by J. Hu, A. Razdan, G. Nielson, G. Farin, D. Baluch, and D. Capco, "Volume Segmentation Using Weibull E-SD Fields," IEEE Transactions on Visualization and Computer Graphics 9(3): 320-328 (2003). Still another suitable segementation process is described by J. Hu, G. Farin, M. Holecko, S. Massia, G. Nielson and A. Razdan, "Statistical 3D Segmentation with Greedy Connected Component Labelling Refinement," Bioengineering Department, PRISM Lab and Computer Science Department, Arizona State University, Tempe, Ariz. The segmentation process described in International Application No. PCT/US03/10665 entitled "Three-Dimensional Digital Library System" and filed on Apr. 4, 2003, can be used to preprocess and improve the surface extraction. The descriptions of these segmentation process are incorporated herein in there entirety by this reference.

After the isosurface extraction algorithm is applied, the resulting mesh is a collection of triangles that converts the line or stroke into a three-dimensional surface mesh in the form of a tubular structure representing the line or stroke. This structure provides the dimensional data to detect which line segment of overlapping line segments lies on top of the other.

Figure 1:
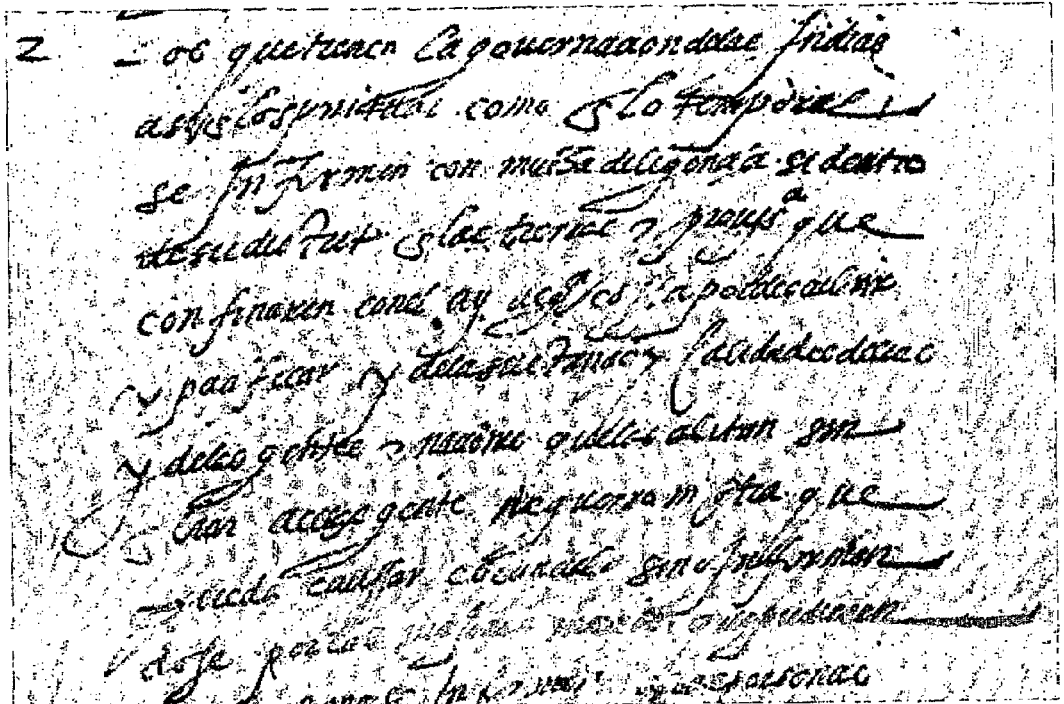
FIG. 1 is an exemplary image of a handwritten manuscript, which illustrates some of the complexities of handwritten text that present problems in the automatic recognition of such text.
Figure 3:
FIG. 3 shows an exemplary image of original handwritten text to be processed for automatic recognition in accordance with the present invention.
Figure 7:
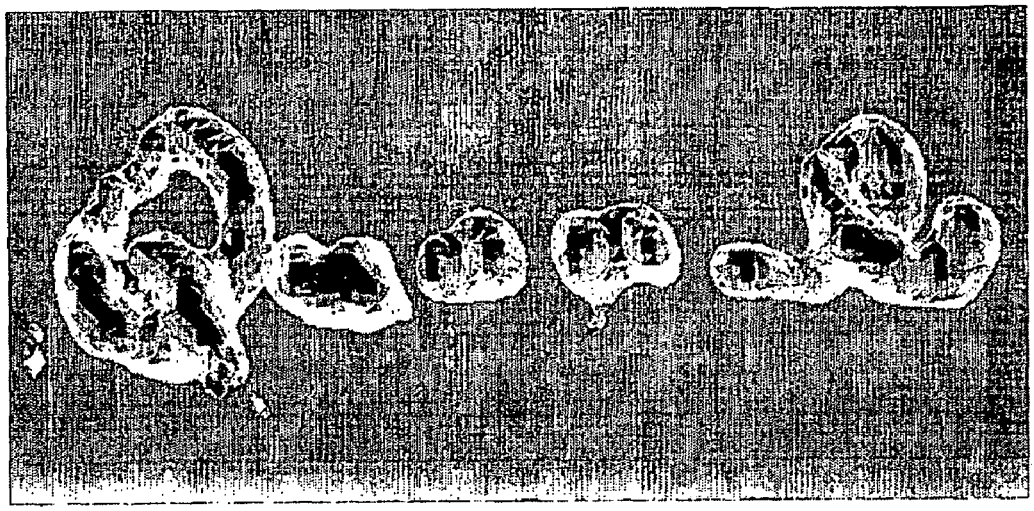
FIG. 7 shows a three-dimensional representation of the surface mesh and tubular structures included in the mesh, which result from processing the two-dimensional image of a portion of the handwritten text of FIG. 3 according to the present invention.

FIG. 7 shows an exemplary three-dimensional representation of the surface mesh and tubular structures of the mesh. The three-dimensional surface mesh of FIG. 7 results from processing the two-dimensional image of a portion of the handwritten text of FIG. 3 according to the present invention.

Figure 2:
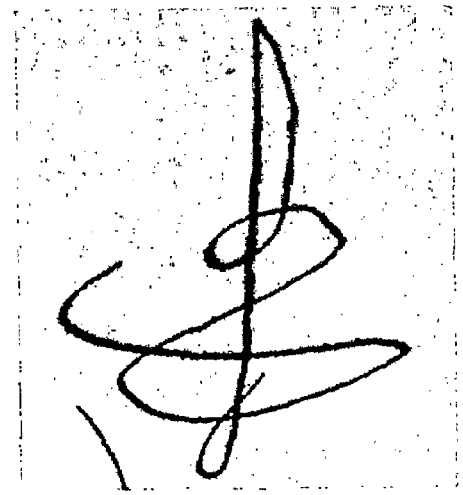
FIG. 2 shows an exemplary image of a rubric from a handwritten manuscript, which further illustrates complexities of handwritten text that present problems in the automatic recognition of such text.
Figure 8:
FIG. 8 shows a three-dimensional representation of the surface mesh and tubular structures included in the mesh, which result from processing the two-dimensional image of the rubric of FIG. 2 according to the invention.

FIG. 8 shows a three-dimensional representation of the surface mesh and tubular structures included in the mesh, which result from processing the two-dimensional image of the rubric of FIG. 2 according to the invention. Comparing FIG. 8 to FIG. 2, it will be noted that the three-dimensional representation of FIG. 8 has been rotated to demonstrate the three-dimensional aspects of the representation.

Figure 9:
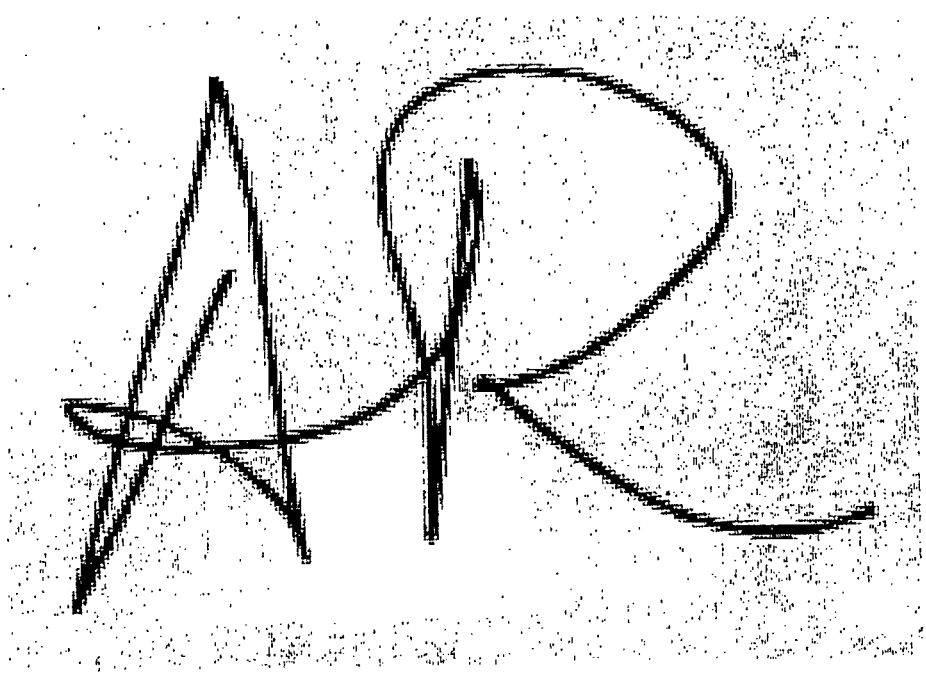
FIG. 9 shows a two-dimensional scanned image of initials "AR" written on paper using a felt-tipped marker.
Figure 10:
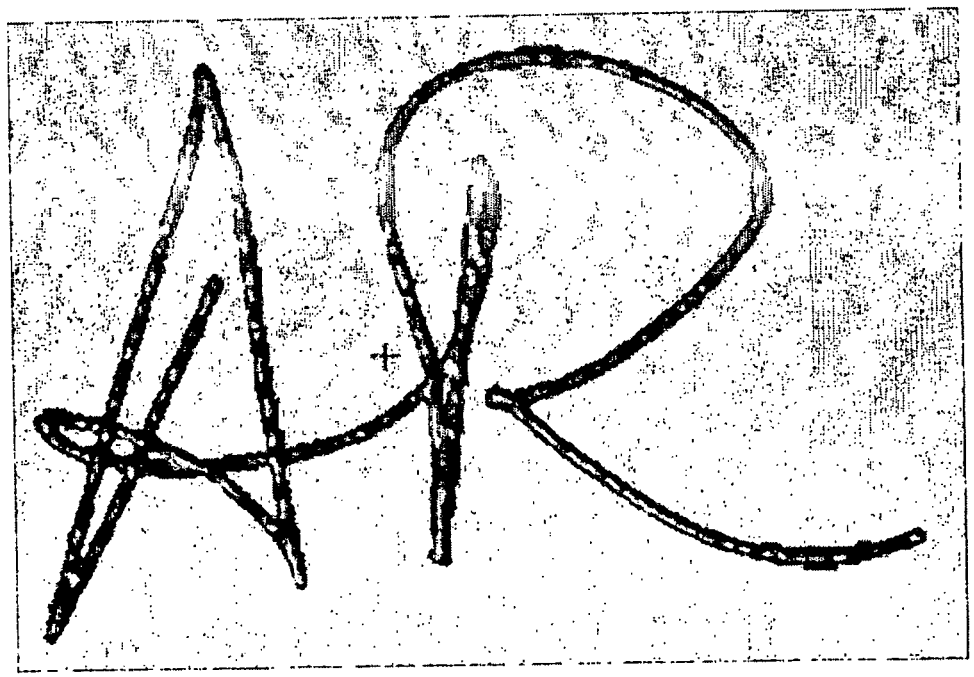
FIG. 10 shows a three-dimensional representation of the surface mesh and tubular structures included in the mesh, which result from processing the two-dimensional image of FIG. 9.

As another example, FIG. 9 shows a two-dimensional scanned image of initials "AR" written on paper using a felt-tipped marker. FIG. 10 shows a three-dimensional representation of the surface mesh and tubular structures included in the mesh, which result from processing the two-dimensional image of FIG. 9.

Figure 11:
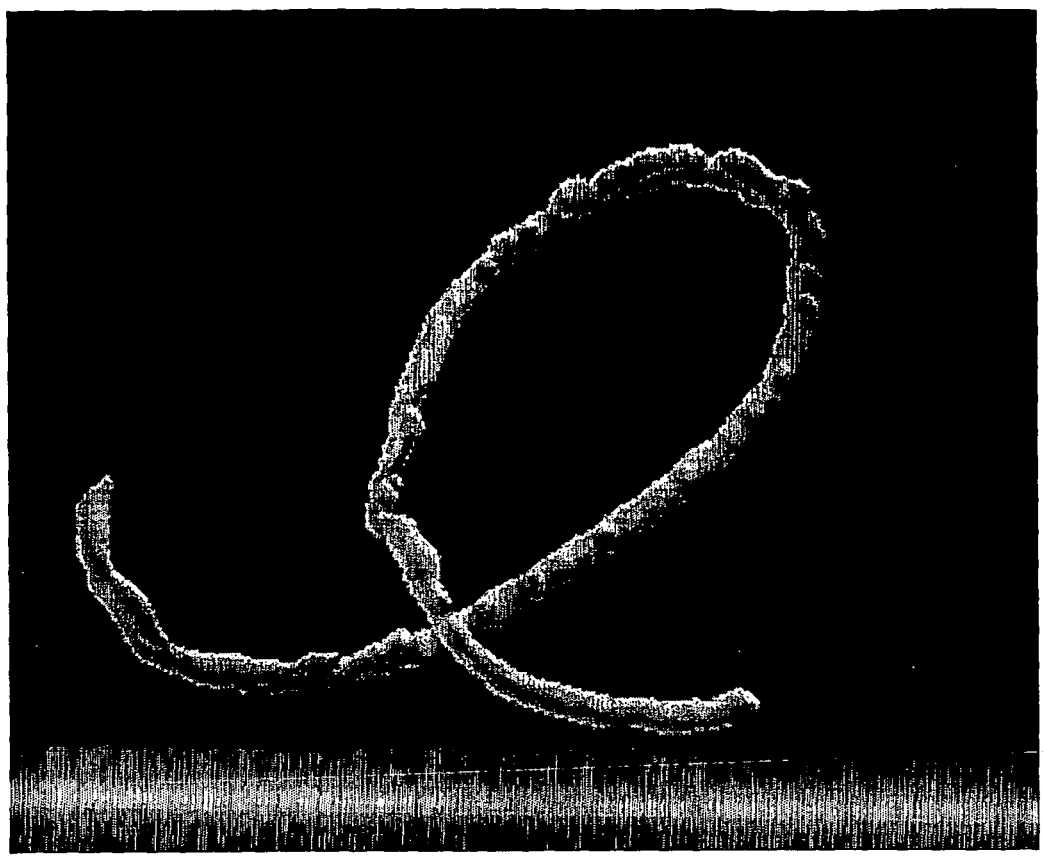
FIG. 11 shows a three-dimensional representation of the surface mesh and tubular structures included in the mesh, which result from processing the two-dimensional image of another example of the handwritten letter "l".
Figure 12:
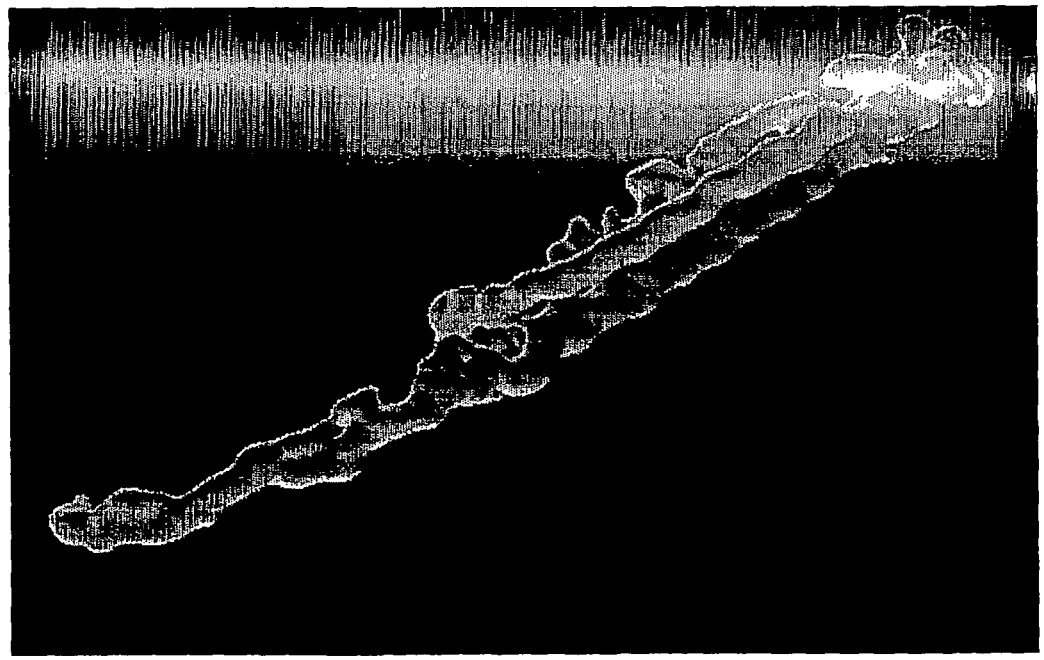
FIG. 12 shows the three-dimensional surface mesh of FIG. 11 rotated on its "side" to show how the three-dimensional representation clearly separates overlap in the loop in the letter "l".

FIG. 11 shows another example of a three-dimensional representation of the surface mesh and tubular structures included in the mesh, which result from processing the two-dimensional image of another example of the handwritten letter "l". The surface mesh was generated using the Marching Cubes process. FIG. 12 shows the three-dimensional surface mesh of FIG. 11 rotated on its "side" to show how the three-dimensional representation clearly separates the overlap of the loop in the letter "l".

As can be seen from FIGS. 7, 8, and 10-12, the 3D surface mesh resulting from surface extraction (step 104) can clearly separate the loops of a character. This greatly simplifies the tasks of identifying the chain codes correctly within a single unit or character. Similarly, the 3D surface mesh can separate overlapping characters, such as when a letter from one row of text intersects letters from a different row of text. Since we can distinguish the surfaces we can therefore distinguish which is the intruding surface and effectively eliminate or better separate the two characters.

Post-Processing

Figure 13:
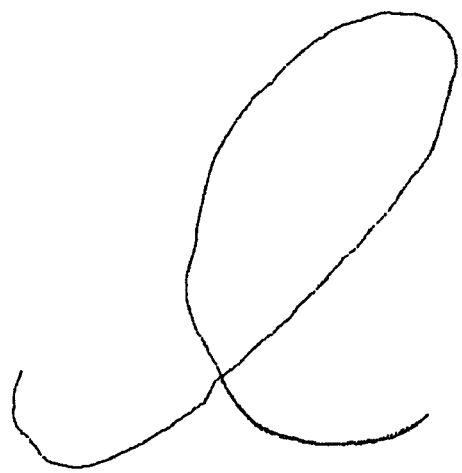
FIG. 13 shows the medial curve of the three-dimensional representation of the letter "l" of FIG. 11.
Figure 14:
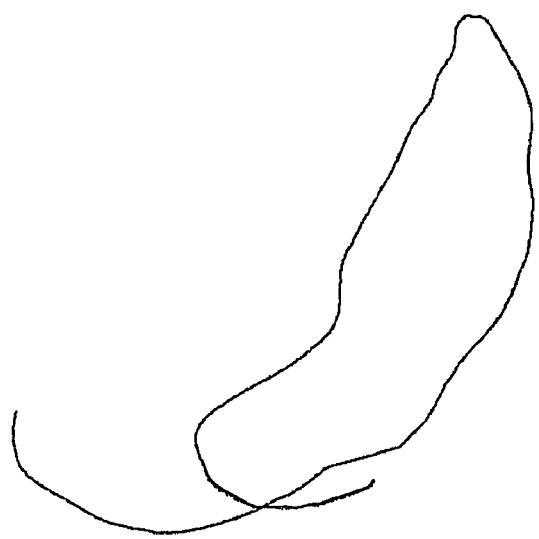
FIG. 14 shows the three-dimensional curve of FIG. 13 rotated at an angle, demonstrating the three-dimensional aspects of the curve.
Figure 15:
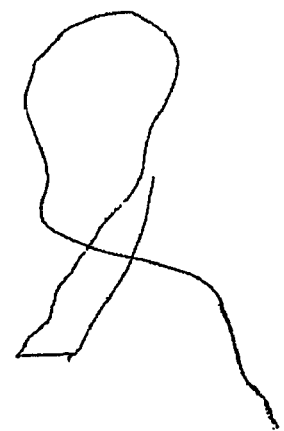
FIG. 15 shows the three-dimensional curve of FIG. 13 rotated at a different angle.

Further processing of the volume data can be performed (step 106) to find the medial axis or curves representing the median of the tubular structures of the surface or mesh representation. Since we can distinguish between the surfaces (i.e., which one is on top or bottom in a loop) we can effectively parameterize the axis or curve. The parameterized curve then solves the chain code problem encountered by 2D methods, which cannot distinguish lines that cross over, such the lines in a loop. This also can be used to solve the problem of identifying overlapping characters. For example, FIG. 13 shows a medial curve of the three-dimensional representation of the letter "l" of FIG. 11. FIG. 14 shows the three-dimensional curve of FIG. 13 rotated at an angle, demonstrating the three-dimensional aspects of the curve. FIG. 15 shows the three-dimensional curve of FIG. 13 rotated at a different angle.

CONCLUSION

The above-described method and system of the present invention possesses numerous advantages as described herein. Additional advantages and modifications will readily occur to those skilled in the art. Therefore, the invention-in its broader aspects is not limited to the specific details, representative devices, and illustrative examples shown and described. Accordingly, departures may be made from such details without departing from the spirit or scope of the general inventive concept.

What is claimed is:

1. A method for automatically extracting and recognizing features in a two-dimensional image comprising a plurality of pixels, wherein each pixel has associated position coordinates (X,Y) and an associated intensity (L), the method comprising:

converting by a processor the two-dimensional image into three-dimensional volumetric data, including:
associating a plurality of voxels with each pixel, wherein each of the plurality of voxels has associated position coordinates (X,Y,Z) and can have a value (V); and
using the pixel intensity (L) and the voxel coordinate (Z) to derive the value (V) for each of the plurality of voxels;

applying a filtering process to produce filtered three-dimensional volumetric data wherein the plurality of voxel values (V) are redistributed; and processing the filtered three-dimensional volumetric data to partition the data into features.

2. The method of claim 1 wherein the two-dimensional image represents a handwritten manuscript.

3. The method of claim 1 comprising using an isosurface extraction process to extract a surface mesh representation of the image.

4. The method of claim 3 comprising determining an axis or curve representing the median of a tubular structure included in the surface mesh representation.

5. The method of claim 3 comprising using the extracted surface mesh representation to resolve overlapping lines in the two dimensional image.

6. A method for automatically extracting and recognizing features in a two-dimensional image comprising a plurality of pixels, wherein each pixel has an associated position (X,Y) and an intensity (L), the method comprising:

converting by a processor the two-dimensional image into three-dimensional volumetric data, including:

associating a plurality of voxels with each pixel, wherein each of the plurality of voxels has associated position coordinates (X,Y,Z) and can have a value (V); and using the pixel intensity (L) and the voxel coordinate (Z) to derive the value (V) for each of the plurality of voxels;

applying a filtering process to produce filtered three-dimensional volumetric data wherein the plurality of voxel values (V) are redistributed;

processing the filtered three-dimensional volumetric data to partition the data into features, including applying a threshold to the filtered three-dimensional volumetric data.

7. The method of claim 6 wherein the two-dimensional image represents a handwritten manuscript.

8. The method of claim 6 further comprising using a surface mesh representation extracted using an isosurface extraction process to resolve features of the two-dimensional image.

9. The method of claim 6 comprising determining an axis or curve representing the median of a tubular portion of a surface mesh representation of the filtered three-dimensional volumetric data.

10. The method of claim 6 comprising using the filtered three-dimensional volumetric data to resolve overlapping lines in the two dimensional image.

11. A computer-readable medium for automatically extracting and recognizing features in a two-dimensional image comprising a plurality of pixels, wherein each pixel has an associated position (X,Y) and an intensity (L), the medium comprising:

computer-executable instructions for:

converting the two-dimensional image into three-dimensional volumetric data, including:

associating a plurality of voxels with each pixel, wherein each of the plurality of voxels has associated position coordinates (X,Y,Z) and can have a value (V); and using the pixel intensity (L) and the voxel coordinate (Z) to derive the value (V) for each of the plurality of voxels;

applying a filtering process to produce filtered three-dimensional volumetric data wherein the plurality of voxel values (V) are redistributed; and processing the filtered three-dimensional volumetric data to partition the data into features.

12. The computer-readable medium of claim 11 wherein the two-dimensional image represents a handwritten manuscript.

13. The computer-readable medium of claim 11 wherein the computer-executable instructions further include instructions for using an extracted surface mesh representation of the image to resolve features of the two-dimensional image.

14. The computer-readable medium of claim 13 wherein the computer-executable instructions further include instructions for determining an axis or curve representing the median of a tubular structure included in the surface mesh representation.

15. The computer-readable medium of claim 13 wherein the computer-executable instructions further include instructions for using the extracted surface mesh representation to resolve overlapping lines in the two dimensional image.

16. A computer-readable medium for automatically extracting and recognizing features in a two-dimensional image comprising a plurality of pixels, wherein each pixel has an associated position (X,Y) and an intensity (L), the medium comprising:

computer-executable instructions for:

converting the two-dimensional image into three-dimensional volumetric data, including:

associating a plurality of voxels with each pixel, wherein each of the plurality of voxels has associated position coordinates (X,Y,Z) and can have a value (V); and using the pixel intensity (L) and the voxel coordinate (Z) to derive the value (V) for each of the plurality of voxels;

applying a filtering process to derive filtered three-dimensional volumetric data wherein the plurality of voxel values (V) are redistributed; and processing the filtered three-dimensional volumetric data to partition the data into features, including applying a threshold to the filtered three-dimensional volumetric data.

17. The computer-readable medium of claim 16 wherein the two-dimensional image represents a handwritten manuscript.

18. The computer-readable medium of claim 16 wherein the computer-executable instructions include instructions for using an extracted surface mesh representation to resolve features of the two-dimensional image.

19. The computer-readable medium of claim 18 wherein using the extracted surface mesh representation comprises determining an axis or curve representing the median of a tubular structure included in the surface mesh representation.

20. The computer-readable medium of claim 18 wherein using the extracted surface mesh representation comprises resolving overlapping lines in the two dimensional image.

* * * * *